US005895569A

United States Patent [19]
Connelly

[11] Patent Number: 5,895,569
[45] Date of Patent: Apr. 20, 1999

[54] SMALL BORE SEWER SYSTEM

[76] Inventor: Richard W. Connelly, 236 Westbrook Rd. Site 6, Box 3-A, RR#3, Carp, Canada, K0A 1L0

[21] Appl. No.: 08/778,627

[22] Filed: Jan. 3, 1997

[30] Foreign Application Priority Data

Jan. 5, 1996 [CA] Canada ................... 2166666

[51] Int. Cl.$^6$ ................................. B01D 21/02
[52] U.S. Cl. ............ 210/170; 210/188; 210/257.1; 210/532.2; 210/539; 210/916; 210/920; 405/36
[58] Field of Search ............... 210/170, 188, 210/257.1, 288, 532.2, 539, 916, 920; 405/36

[56] References Cited

U.S. PATENT DOCUMENTS

| | | | |
|---|---|---|---|
| 1,281,528 | 10/1918 | Davis | 210/532.2 |
| 1,616,394 | 2/1927 | Schiding | 210/539 |
| 1,641,469 | 9/1927 | Baker | 210/532.2 |
| 1,677,626 | 7/1928 | Frappy | 210/532.2 |
| 2,852,140 | 9/1958 | MacLaren | 210/532.2 |
| 3,109,813 | 11/1963 | Bergsten et al. | 210/532.2 |
| 3,211,167 | 10/1965 | Clift et al. | 210/170 |
| 3,335,082 | 8/1967 | Ullrich | 210/916 |
| 3,730,884 | 5/1973 | Burns et al. | 210/170 |
| 3,875,051 | 4/1975 | Kovarik | 210/170 |
| 4,594,153 | 6/1986 | Weis | 210/170 |
| 4,824,572 | 4/1989 | Scott | 210/170 |
| 4,971,690 | 11/1990 | Justice | 210/532.2 |
| 4,997,562 | 3/1991 | Warner | 210/532.2 |
| 5,049,265 | 9/1991 | Boyd et al. | 210/188 |
| 5,083,885 | 1/1992 | Ushitora et al. | 210/170 |
| 5,198,113 | 3/1993 | Daniels | 210/170 |

OTHER PUBLICATIONS

R.W. Connelly Associates, Inc., Information Bulletin, "Small Bore Sewers—Technology Update", pp. 1–3.
Ministry of Environment and Energy, "Communal Sewage Systems", 1994, pp. 1–24.
National Small Flows Clearinghouse, West Virginia University by Robert E. Langford, "Septic Tank Effluent Pump Pressure Sewer System", Oct. 2–7, 1997, pp. 9–14 & 61–66.
United States Environmental Protection Agency "EPA", "Alternative Systems For Small Communities and Rural Areas", May 1992, 1 Page.
University of Kentucky, "Proceedings 1985 International Symposium On Urban Hydrology, Hydraulic Infrastructures and Water Quality Control", Jul. 22–25, 1985, Figure 1.
"R.W. Connelly Associates Inc. Breaking The Price Barrier For Sewer Systems" Business and Finance, Dec. 1991.
Pipeline Newsletter, National Small Flows Clearinghous, Fall 1996, vol. 7, No. 4.

*Primary Examiner*—Christopher Upton
*Attorney, Agent, or Firm*—Wenderoth, Lind & Ponack, L.L.P.

[57] ABSTRACT

There is provided in the present invention a small bore sewer system comprising a clarifier tank for receiving sewage, separating liquid and solid sewage and retaining the solid sewage; and a collection device connected to the clarifier tank for receiving the liquid sewage and carrying it to a sewage treatment plant. The system may further include pumping stations and gravel and sand odor filters.

5 Claims, 5 Drawing Sheets

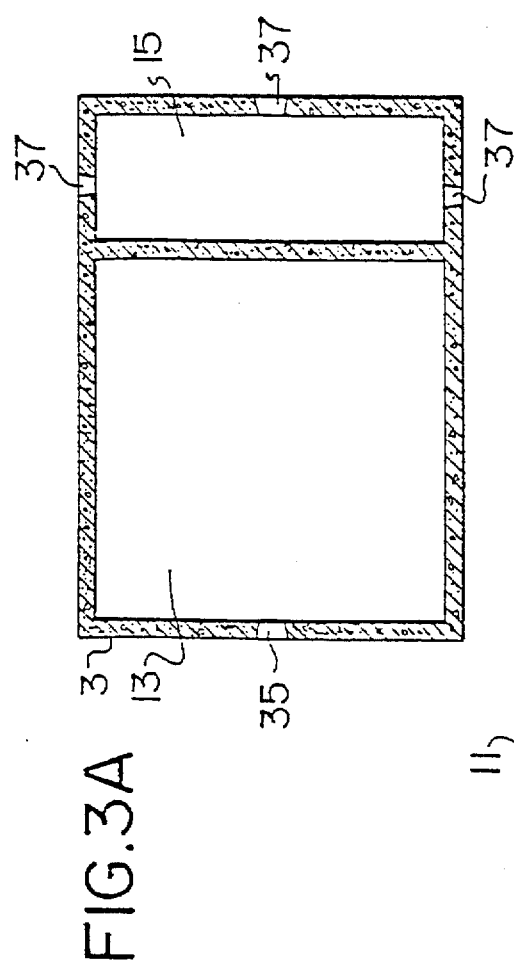
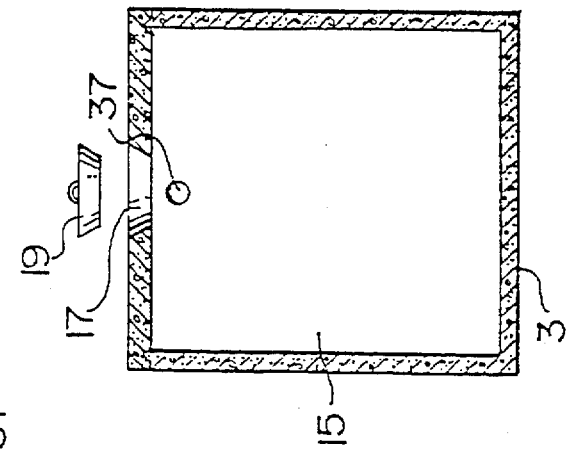
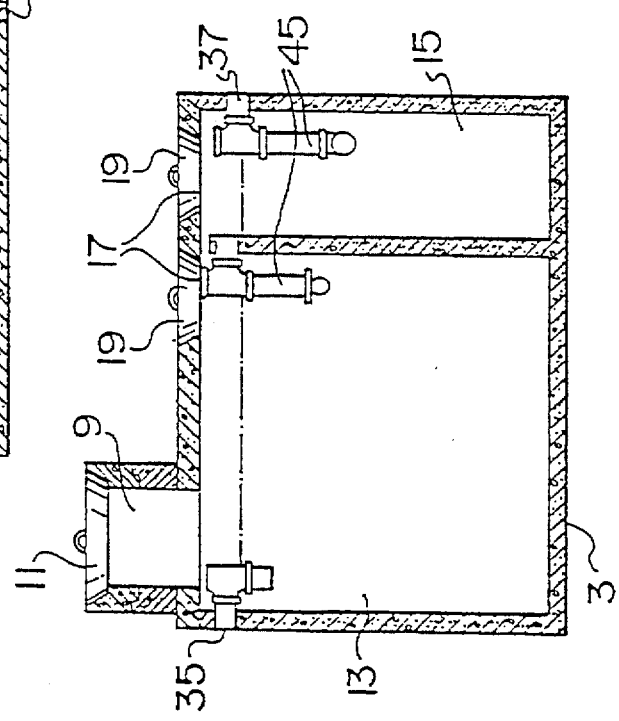

SMALL BORE SEWER SYSTEM

FIELD OF THE INVENTION

The present invention relates to the field of sewer systems for municipal developments.

BACKGROUND OF THE INVENTION

The cost of installing a conventional sewer system in a new parcel of land, whether its end use is residential, industrial or commercial, is one of the largest roadblocks to economic development for any community. Similarly, small or remote communities cannot afford the high price of adding a conventional sewer system even for residential usage and citizens continue to use private wells and inefficient septic systems.

Conventional sewer system installations cause significant disruption to a community and require major reconstruction of roadways. Individual dwellings are connected to a conventional sewer system through the use of large diameter rigid piping consisting of a series of connected pieces of pipe. The connections of these pipes are often leaky allowing infiltration of ground water which can account for up to 50% of a conventional sewage system's capacity. Leakage also results in exfiltration of sewage effluent. Moreover, the pipes must be deeply buried in areas of high frost penetration. Therefore, conventional sewer pipes require the digging of large, straight trenches approximately 6 to 8 feet deep. As well, the preferred and normal location of conventional systems is the roadway centerline. Conventional sewers therefore are timely to install and the choice of overall layout is dictated by access for maintenance.

Conventional systems are sensitive to gradient changes. Pipe gradients are steeper than prevailing road gradient to allow for the required high cleaning water velocities. The pipes must be kept in a straight alignment between manholes to aid maintenance and cleaning of the system.

The inclusion of ground water and high peaking factors in the design of pipes, pump stations, and treatment plants results in an overall conventional sewer system which is a large, complex system. Conventional sewer systems produce sludge at the treatment plants which must be removed regularly. Due to the short time it is in the system, there is little degradation of sludge and therefore high sludge volumes result. Lift pumps must be correspondingly large and complex in order to handle solids and high peak flows.

Therefore, there is a need to provide an efficient sewer system which is inexpensive to install and maintain. It should utilize flexible piping which does not need to be laid in straight alignment and which prevents infiltration of ground water and exfiltration of sewage. There is also a need for a sewage system which is not dependent on roadways and existing infrastructures for layout design.

SUMMARY OF THE INVENTION

It is an object of the present invention to overcome the disadvantages of the prior art and to provide a sewer system which is easy and economical to install and can be easily adapted to circumvent existing roadways and infrastructures.

It is also an object of the present invention to provide a sewer system which does not allow excessive infiltration of ground water or exfiltration of sewage.

Therefore, the present invention provides a sewer system for the carrying of sanitary sewage from the sources thereof for treatment at treatment centers comprising a clarifier tank for receiving sewage whereby liquid and solid sewage is substantially separated and substantially all of the solid sewage is retained in the clarifier tank. The clarifier tank comprises a tank having two interconnected compartments, i.e. a first compartment for receiving sewage and retaining solid sewage, and a second compartment for receiving liquid sewage from the first compartment and discharging sewage. A collection means is connected to the clarifier tank for receiving the substantially liquid sewage and carrying it to a treatment center. Also, a means is provided for carrying sewage from the sewage source to the clarifier tank.

In a further embodiment, the present invention also provides a sewer system for the carrying of sewage from individual buildings for treatment at treatment centers comprising a clarifier tank for receiving sewage having a first and second compartment with a conduit therebetween, inlet means into the first compartment, outlet means from the second compartment. Due to the construction of the clarifier tank, solid sewage is substantially retained in the first compartment. A first pipe is connected to the sewage system of a building and to the inlet means in the tank for carrying sewage from a building to the tank. Also, a collection means is connected to the outlet means of the tank for receiving substantially liquid sewage and carrying it to a treatment center.

BRIEF DESCRIPTION OF DRAWINGS

Preferred embodiments of the present invention will now be described and may be better understood when read in conjunction with the following drawings in which:

FIG. 3 is a cross sectional view of a clarifier tank from FIG. 1 in which FIG. 3A is a top cross sectional view, FIG. 3B is a side cross sectional view, and FIG. 3C is an end cross sectional view.

FIG. 6 is a schematic cross sectional view of a pump station connected to the collection main from FIG. 1 in which

FIG. 7 is a cross sectional schematic view of a manhole and cleaning system for the sewer system of FIG. 1 in which

FIG. 8 is a perspective view of a soil filter and vents for the sewer system of FIG. 1 in which

DETAILED DESCRIPTION OF PREFERRED EMBODIMENT

Figure 1:
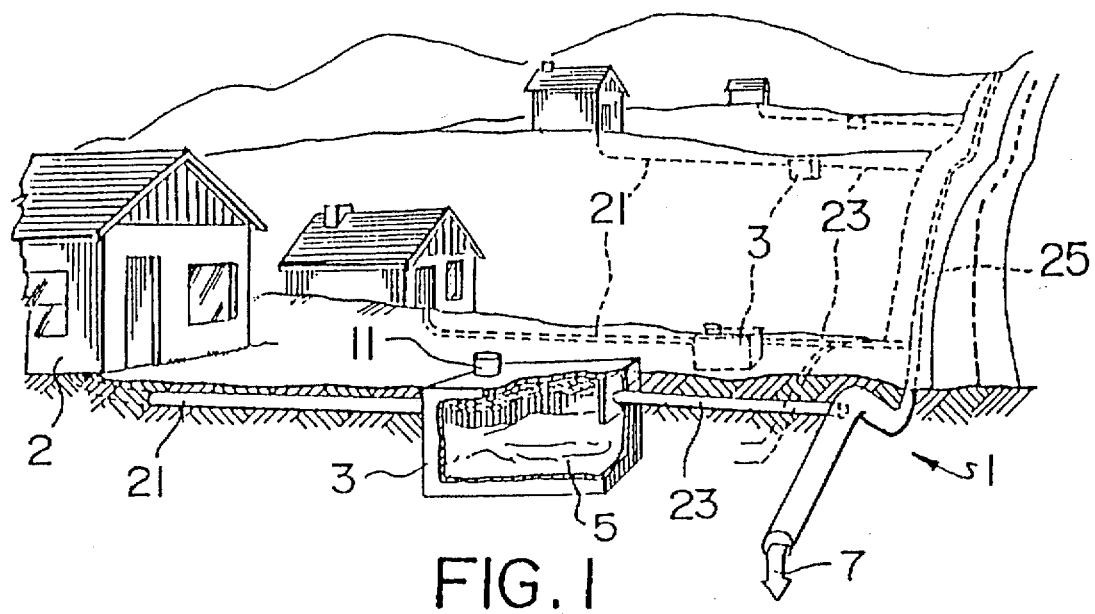
FIG. 1 is a perspective partial cross sectional overview of one embodiment of the sewer system of the present invention.

Referring to FIG. 1, there is depicted the Small Bore Sewer* system 1 of the present invention. This system is designed to collect sewage from commercial, industrial and residential housing and carry it to a central treatment center for processing. It is designed to be used, in particular, in small communities which either do not have a common sewer system or can not afford a conventional sewer system. Preferably, it should be connected to no more than about 1400 dwellings to ensure efficiency. It is particularly well adapted to be installed in remote areas or areas with large amounts of rock near the ground surface which do not allow private sewage disposal systems to work well.

\* denotes trade-mark

As shown in FIG. 1, the sewer system 1 of the present invention comprises a clarifier tank 3, connected to and receiving sewage from a building 2, which tank separates solid 5 and liquid 7 sewage. The liquid sewage 7 is carried through sewer pipes to a collection main 25 where it flows to a central treatment center.

The clarifier tank 3, shown in detail in FIGS. 3A, B and C is made preferably of concrete but may be made of any suitable material such as fibreglass or high density polyethylene (HDPE). It comprises two compartments 13, 15. The tank 3 is connected to a building's sewage system through a sewer pipe 21 which receives sewage from the building 2 and empties it into the main compartment 13 of the tank 3. Each building 2 may have one or several clarifier tanks 3 or several buildings 2 may be connected to one tank 3, depending upon the sewer demand.

In the main compartment 13 of the tank 3, solid sewage 5 settles. Liquid sewage 7 flows from the main compartment into a separate side compartment 15 before flowing out of the clarifier tank 3 and into the rest of the sewer system 1. This side compartment 15 allows remaining solid sewage 5 particles suspended in the liquid sewage 7 to settle out before the liquid sewage 7 passes into the remaining portions of the sewer system 1. The tank 3 has several openings 9, 17 and lids 11, 19 in its top to enable easy access to the compartments 13, 15 of the tank 3 for maintenance and repairs as well as removal of solid sewage 5. It will be understood, moreover, that the tank 3 may include additional settling compartments to receive the outflow from side compartment 15. Provision of additional compartments will permit additional sludge solids to settle from the sewage liquid before discharge thereof into the system 1.

Solid sewage 5 settling to the bottom of the main compartment 13 of the tank 3 is reduced by the action of anaerobic digestion. The solid sewage 5 accumulates for a period of time and may then be pumped out of the tank 3 and removed on a regular basis. Preferably it is removed every five to seven years. The solid sewage 5 is removed through an opening 9 in the top of the tank 3. A lid 11 is removed to gain access to the main compartment 13 of the clarifier tank 3. By removing the solid sewage 5 at each dwelling 2, the sewage liquid in the system 1 is effectively pre-treated before it enters a treatment plant. Therefore, this sewer system 1 results in a reduction in size and complexity of the necessary municipal sewage treatment plants.

Figure 2:
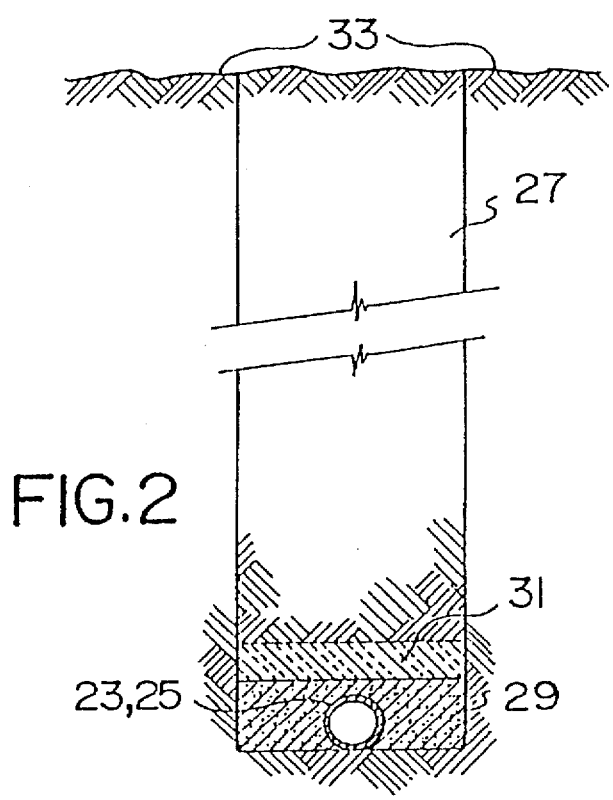
FIG. 2 is an end cross sectional view of the sewer pipe from FIG. 1.

The liquid sewage 7 flows out of the clarifier tank 3 and into the lateral sewer pipe 23 which carries it to the collection main 25 shown in FIG. 1. The piping 23, 25 (in FIG. 2, pipe 23 is shown in more detail) is flexible and substantially smaller in diameter than conventional sewer pipes. It is made of high density polyethylene and its joints are heat welded, virtually eliminating infiltration of groundwater and exfiltration of sewage. Moreover, all jointing in the sewer system 1 is preferably chemically or heat welded. Because the piping 23, 25 is flexible, it does not need to be placed in straight alignment as do conventional sewer pipes. It may deviate from a straight path to avoid obstacles or for ease of installation. Because of the smaller size and flexibility of the pipe 23, it is placed in a dug trench 27 which does not need to be as wide or deep as in conventional sewer systems.

Typically, the trench 27 is narrow and shallow, approximately one foot wide and three feet deep. Where necessary due to climatic or environmental conditions, the pipe 23 is surrounded by a sand bedding 29 and covered with insulation material 31 such as styrofoam insulation. The trench 27 is then backfilled as in conventional systems to restore the ground property 33 to its original condition.

Figure 4:
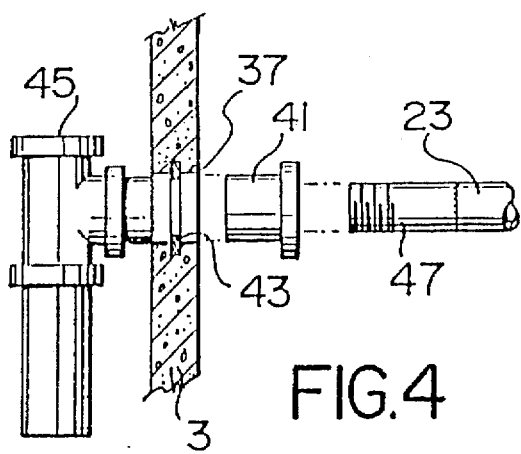
FIG. 4 is a schematic diagram of an outlet connection from the clarifier tank to lateral sewer pipes from FIG. 1.
Figure 5:
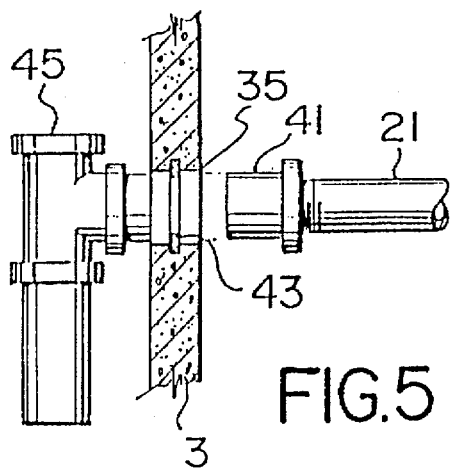
FIG. 5 is a schematic diagram of an inlet connection from building sewer pipes to the clarifier tank from FIG. 1.
Figure 7A:
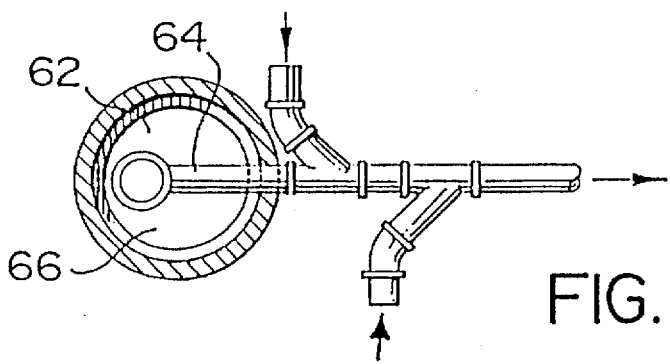
FIG. 7A is top schematic view of the manhole and cleaning system and FIG. 7B is a side cross sectional view of the manhole and cleaning system.
Figure 7B:
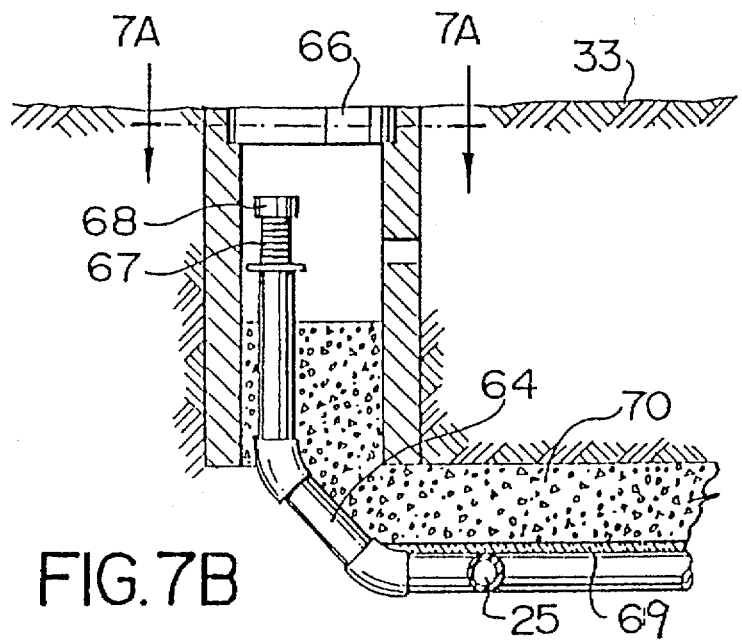

Pipes 23 and 21 are connected to the clarifier tank 3 as shown in FIGS. 4 and 5, respectively. The inlet pipe 21 bringing sewage from a building 2 enters the clarifier tank 3 at the opening 35. This opening is preferably 4" in diameter. This location deposits solid 5 and liquid 7 sewage in the main compartment 13 of the clarifier tank 3. As the solid sewage 5 settles out in the main compartment of the tank 3, the liquid sewage 7 flows from the main compartment 13 into the side compartment 15. The outlet sewer pipe 23 takes the liquid sewage 7 out of the 3" opening 37 in the side compartment 15 and to the collection main 25. The pipes 23 and 21 are attached to the clarifier tank 3 through an attachment assembly. The attachment assembly comprises a female threaded bell 41, threaded HDPE lateral adaptor 47, gasket 43, and tee pipe 45. The bell 41 fits into the opening 37. Located on the inside of the clarifier tank 3 in the opening 37 is the tee portion 45 which connects to the bell 41. The opening 37 is made watertight by the utilization of a gasket 43 in the opening 37. Preferably an A-LOK gasket is used. The adaptor 47, in the case of pipe 23, is a small section of pipe 47 which is connected to the bell 41 and fuse welded to the pipe 23. A similar connection system may be used, if necessary, for pipe 21 at the outlet opening 35 of the clarifier tank 3. Preferably, the pipe 21 is attached directly to the bell 41. The ends of 41 and 21 have a threaded connection and are threaded together.

The pipe 23 brings liquid sewage 7 to the collection main 25. The liquid sewage 7 flows through the collection main 25 to a central treatment center. If the gradient differs substantially, pumping stations 50 may be provided, spaced along the collection main 25.

Figure 6A:
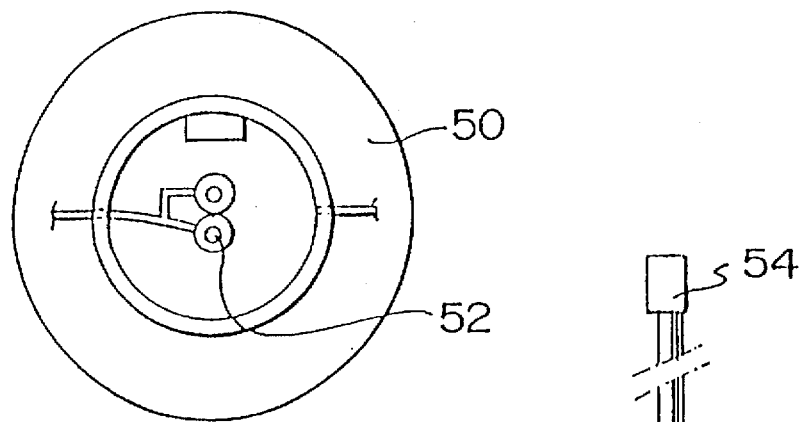
FIG. 6A is a schematic cross sectional top view of the pump station and FIG. 6B is a side schematic cross sectional view of the pump station.
Figure 6B:
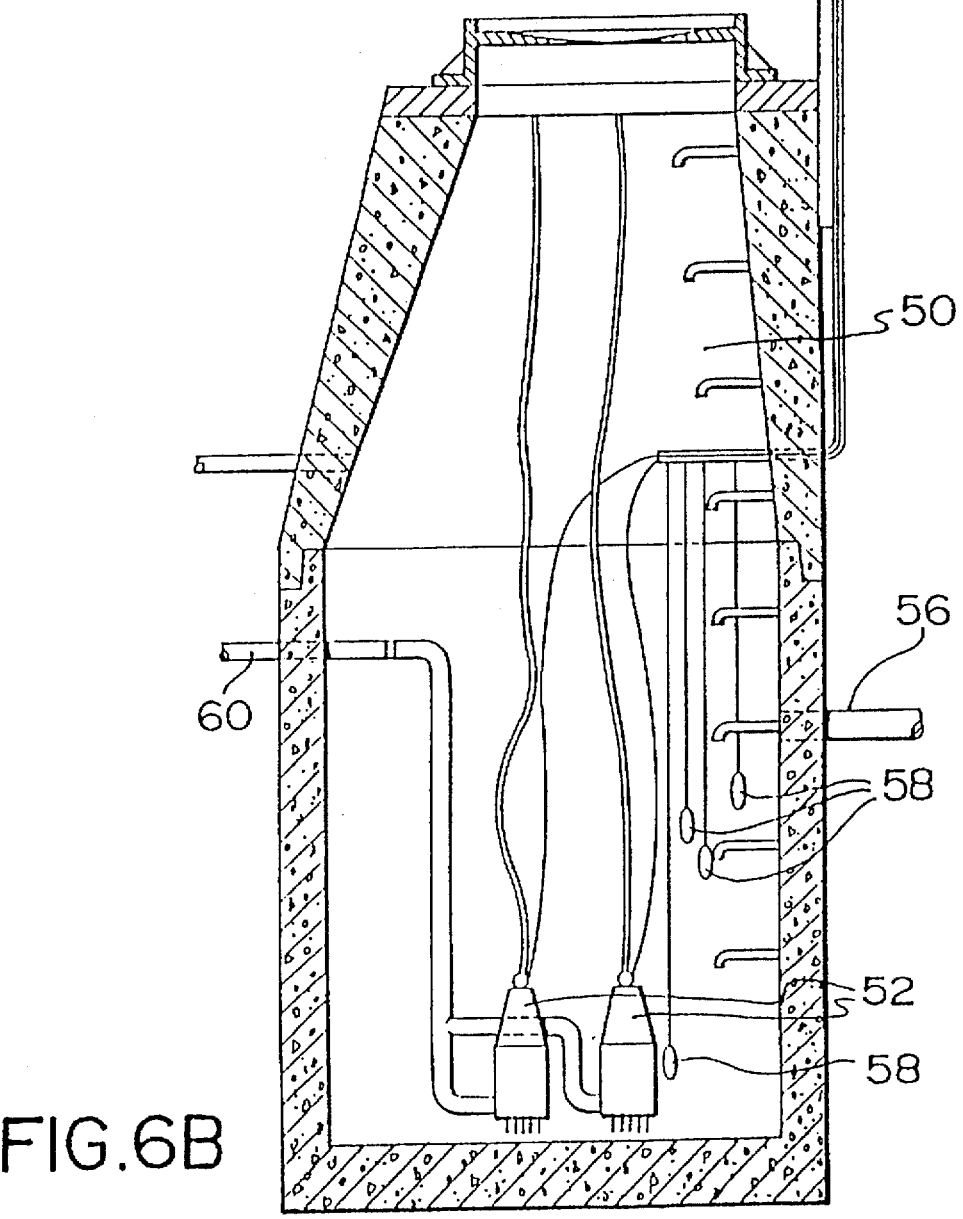
Figure 8A:
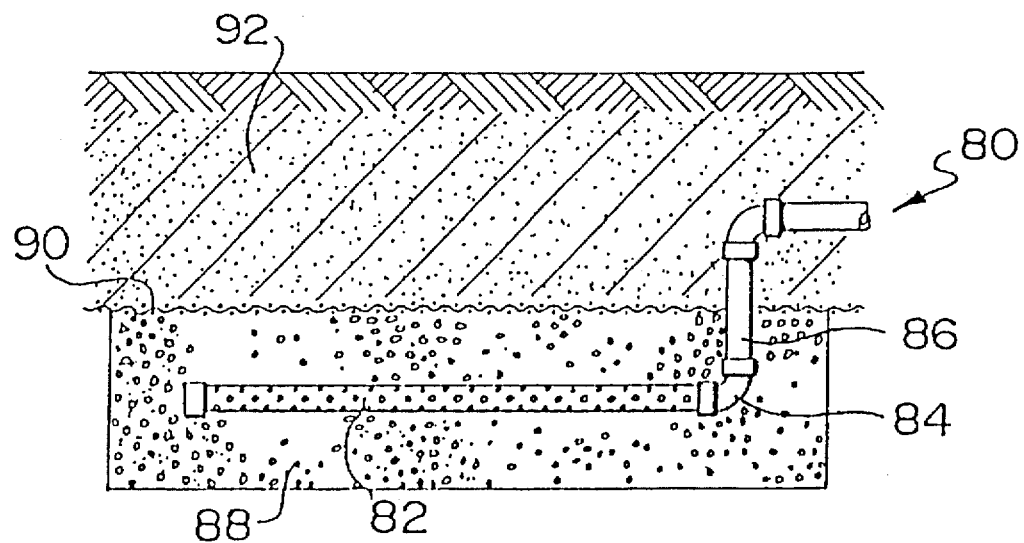
FIG. 8A is a side perspective view of the filter and FIG. 8B is a top perspective view.
Figure 8B:
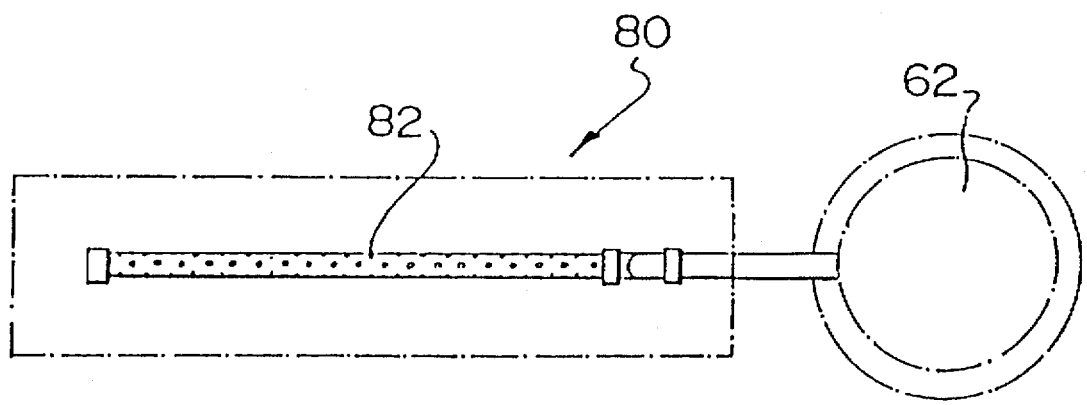

Detailed in FIG. 6, a pumping station 50 is inserted in the collection main 25 to aid in the flow of the liquid sewage 7 to a treatment center. The pumping station 50 includes submersible pumps 52 wired to a control panel 54 which is preferably located above ground. An inlet pipe 56 from the collection main 25 discharges liquid sewage 7 into the station 50. The submersible pumps 52 have a series of floats 58 which activate the pumps 52 when the level of the liquid sewage 7 in the pumping station reaches predetermined heights. The liquid sewage 7 is pumped out of the pumping station 50 and into a forcemain 60 which carries the liquid sewage 7 to a central sewage treatment center. A-LOK gaskets are used to maintain watertight connections between the walls of the pumping station and the inlet pipe 56 and the forcemain 60. Because only liquid sewage is pumped through the pumping station, submersible pumps 52 need only be effluent pumps rather than more complex and expensive sewage pumps required in conventional sewer systems.

The Small Bore Sewer\* system 1 permits a low flow rate due to the absence of solid sewage passing through the system 1 and therefore fewer pumping stations 50 are required than in conventional sewer systems. The absence of solid sewage also allows for easier cleaning of the system 1. Access points 62 such as node cleanouts or manhole openings and covers are provided along the system 1 at spaced intervals. Because of the absence of solid sewage and the ease of cleaning the system 1, the manhole access points 62 do not need to be placed as close together as in a conventional sewer system. Stand pipes 64 below the manhole access covers 66 connect to the collection main 25. The stand pipe 64 has a vent cap 68, flange and adaptor 67 at its upper end to connect to a hose such as a fire hose for easy flushing of the system 1. Flushing is required less often than in conventional systems and may occur approximately every five years. Insulation 69 and clear stone 70 are provided to protect the piping 64 from damage, for example, due to the elements and frost.

* denotes trade-mark

A further feature of the present invention is a soil filter and vent 80. The soil filter 80 absorbs odors from septic gases created within the sewer and releases the gases through vents. The soil filter and vents 80 may be connected to the clarifier tank 3, manhole 62 or pumping station 50 using a gasket, for example, an A-LOK gasket. The soil filter 80 consists generally of perforated PVC piping 82 connected to the tank 3, station 50 or manhole 62 through a series of elbows 84. The elbows 84 and piping 86 ensures that groundwater does not infiltrate the sewer system 1. The perforated piping 82 is surrounded by a bed of gravel 88 covered with geotextile fabric 90 and a layer of sand backfill 92. The gravel/sand filter media is located above the maximum high water table.

It is understood that variations may be made to the above description without departing from the spirit of the invention. The foregoing description is therefore not intended to limit the scope of the invention in any way.

I claim:

1. A sewer system for carrying sanitary sewage from a source thereof for treatment at treatment centers, said sewer system comprising:

means for carrying sewage from the source of the sewage;

a clarifier tank for receiving sewage from the source of sewage via said means for carrying sewage, said clarifier tank comprising a first compartment for receiving sewage and retaining solid sewage, and a second compartment in fluid communication with said first compartment for receiving substantially liquid sewage from said first compartment, wherein liquid and solid components of the sewage are substantially separated and substantially all of the solid sewage is retained in said clarifier tank;

said first compartment of said clarifier tank being provided with an inlet means and said second compartment of said clarifier tank being provided with an outlet means;

collection means comprising a sewage carrying conduit connected to said clarifier tank and a collection main, connected to said sewage carrying conduit, for receiving the substantially liquid sewage from said second compartment of said clarifier tank and carrying it to a treatment center;

attachment means for connecting said means for carrying sewage to said inlet means of said first compartment and said collection means to said outlet means of said second compartment;

at least one pumping station substantially in-line with said collection means, said pumping station comprising a tank having an inlet means for receiving the substantially liquid sewage from said collection means, outlet means for pumping the substantially liquid sewage out to said collection means, at least one submersible pump connected to said outlet means, and activating means for activating and deactivating said pump;

said collection means further comprising a forcemain for receiving the substantially liquid sewage from said pumping station;

cleanout means comprising one or more openings spatially positioned along said collection means; and filter means for absorbing odor from and releasing sewer gases, said filter means being connected to said clarifier tank, said cleanout means or said pumping station, and said filter means comprising perforated pipe disposed within a gravel and sand filter bed.

2. The sewer system as claimed in claim 1, wherein said means for carrying sewage and said collection means comprise flexible pipe.

3. A sewer system for carrying sewage from individual buildings for treatment at treatment centers, said sewer system comprising:

a clarifier tank for receiving sewage;

said clarifier tank having a first compartment, a second compartment, an overflow conduit between said first and second compartments, inlet means into said first compartment, and outlet means from said second compartment, wherein solid sewage is substantially retained in said first compartment;

piping connected to said clarifier tank inlet means for carrying sewage from a building to said clarifier tank;

collection means connected to said clarifier tank outlet means for receiving substantially liquid sewage and carrying it to a treatment center, said collection means comprising:

a flexible pipe connected to said clarifier tank outlet means; and a flexible collection main connected to said flexible pipe for carrying substantially liquid sewage to a treatment center; and a filter means connected to the sewer system for absorbing odor from and releasing sewer gases, wherein said filter means comprises perforated pipe disposed within a gravel and sand filter bed.

4. The sewer system as claimed in claim 3, wherein said flexible pipe is made from high density polyethylene.

5. The sewer system as claimed in claim 3, wherein said piping is non-jointed.

* * * * *